(12) United States Patent
Twigg et al.

(10) Patent No.: US 11,785,964 B2
(45) Date of Patent: Oct. 17, 2023

(54) AERATED FOOD PRODUCTS

(71) Applicant: Conopeo, Inc., Englewood Cliffs, NJ (US)

(72) Inventors: Sarah Twigg, Turvey (GB); Stephen Wilson, Northampton (GB)

(73) Assignee: Conopco, Inc., Englewood Cliffs, NJ (US)

( * ) Notice: Subject to any disclaimer, the term of this patent is extended or adjusted under 35 U.S.C. 154(b) by 413 days.

(21) Appl. No.: 16/461,898

(22) PCT Filed: Nov. 17, 2017

(86) PCT No.: PCT/EP2017/079690
§ 371 (c)(1),
(2) Date: May 17, 2019

(87) PCT Pub. No.: WO2018/108452
PCT Pub. Date: Jun. 21, 2018

(65) Prior Publication Data
US 2019/0328002 A1    Oct. 31, 2019

(30) Foreign Application Priority Data
Dec. 13, 2016 (EP) .................................. 16203782

(51) Int. Cl.
| | | |
|---|---|---|
| A23G 9/32 | (2006.01) | |
| A23L 31/00 | (2016.01) | |
| A23G 3/36 | (2006.01) | |
| A23G 3/52 | (2006.01) | |
| A23G 9/20 | (2006.01) | |
| A23G 9/46 | (2006.01) | |
| A23J 1/00 | (2006.01) | |
| A23L 3/44 | (2006.01) | |

(52) U.S. Cl.
CPC ................. *A23G 9/32* (2013.01); *A23G 3/36* (2013.01); *A23G 3/52* (2013.01); *A23G 9/20* (2013.01); *A23G 9/46* (2013.01); *A23J 1/00* (2013.01); *A23L 3/44* (2013.01); *A23L 31/00* (2016.08); *A23V 2002/00* (2013.01)

(58) Field of Classification Search
CPC ... A23G 3/52; A23G 9/20; A23G 9/46; A23G 9/42; A23J 1/00; A23L 31/00; A23L 31/15
See application file for complete search history.

(56) References Cited

U.S. PATENT DOCUMENTS

| | | |
|---|---|---|
| 2006/0024417 A1 | 2/2006 | Berry et al. |
| 2006/0024419 A1 | 2/2006 | Aldred et al. |
| 2008/0213453 A1 | 9/2008 | Burmester et al. |
| 2010/0086647 A1* | 4/2010 | Kristiansen .......... A23K 20/147 426/62 |
| 2012/0135127 A1 | 5/2012 | Cheng |

FOREIGN PATENT DOCUMENTS

| | | | |
|---|---|---|---|
| CN | 1546525 | 11/2004 | |
| CN | 101026968 | 8/2007 | |
| CN | 101755871 | 6/2010 | |
| CN | 103141602 | 6/2013 | |
| CN | 103750160 | 4/2014 | |
| CN | 104186905 | 12/2014 | |
| CN | 104187598 | 12/2014 | |
| CN | 105213290 | 1/2016 | |
| EP | 1621084 | 1/2006 | |
| EP | 1926389 | 4/2009 | |
| JP | H01091757 | 4/1989 | |
| JP | 638667 | 2/1994 | |
| JP | 11221069 | 8/1999 | |
| JP | 2013227270 | 11/2013 | |
| WO | WO2006010425 | 2/2006 | |
| WO | WO2007039065 | 4/2007 | |
| WO | WO-2007039066 A1 * | 4/2007 | .......... A23C 9/1524 |
| WO | WO2014102181 | 7/2014 | |
| WO | WO2014169293 | 10/2014 | |

OTHER PUBLICATIONS

Zayas "Foaming Properties of Proteins" In: Functionality of Proteins in Food. Abstract. pp. 1-23. Springer, Berlin, Heidelberg. 1997 https://link.springer.com/chapter/10.1007/978-3-642-59116-7_6 (Year: 1997).*
Cutler (ed.) Protein Purification Protocols 2nd Edition 2004 pp. 38, 40, 43, 44, 85, 86, 117, and 309 (Year: 2004).*
IPRP2 in PCTEP2017079690; Nov. 22, 2018, pp. 1-8.
Search Report and Written Opinion in PCTEP2017079690; dated Jan. 17, 2018, pp. 1-10.
Search Report and Written Opinion in EP16203782; dated Mar. 28, 2017, pp. 1-6.
Search Report and Written Opinion in PCTEP2017079692; dated Dec. 21, 2017, pp. 1-10.
IPRP2 in PCTEP2017/079692; Nov. 19, 2018; Nov. 19, 2018, pp. 1-8.
IPRP2 in PCTEP2017079691; Nov. 22, 2018, pp. 1-9.
Search Report and Written Opiniion in EP16203794; dated Mar. 30, 2017, pp. 1-8
The Han Nguyen, Anupam Giri, Toshiaki Oshima; A Rapid HPLC Post-Column Reaction Analysis for the Quantification of Ergothioneine in Edible Mushrooms and In Animals Fed a Diet Supplemented with Extracts from the processing waste of cultivated mushrooms; Food Chemistry ; Jan. 19, 2012; pp. 585-591; XP002768369; vol. 133; United States of America.
A basic guide to particle characterization; Whitepaper; Malvern Instruments Worldwide; www.malvern.com/contact; 2015 Malvern Instruments Limited (24 pages).
Unknown; Economic Animals and Plants in Qin-Ba Mountain Areas; Forest Industry Administration of Shaanxi Province; Nov. 30, 1900; pp. 268 (with original and translation of relevant portions, total of 5 pages).

(Continued)

Primary Examiner — Nikki H. Dees
(74) Attorney, Agent, or Firm — Foley & Lardner LLP

(57) ABSTRACT

An aerated food product is provided which includes *Volvariella volvacea* extract. Also provided is the use of a *Volvariella volvacea* extract in a method of inhibiting bubble coarsening in aerated food products.

10 Claims, 15 Drawing Sheets

(56) References Cited

OTHER PUBLICATIONS

Shouhong, C.; Chinese Food Ingredients; Apr. 30, 2016; p. 530 (with original and translation of relevant portions, total of 5 pages); middle volume; Hefei University of Technology Press.

* cited by examiner

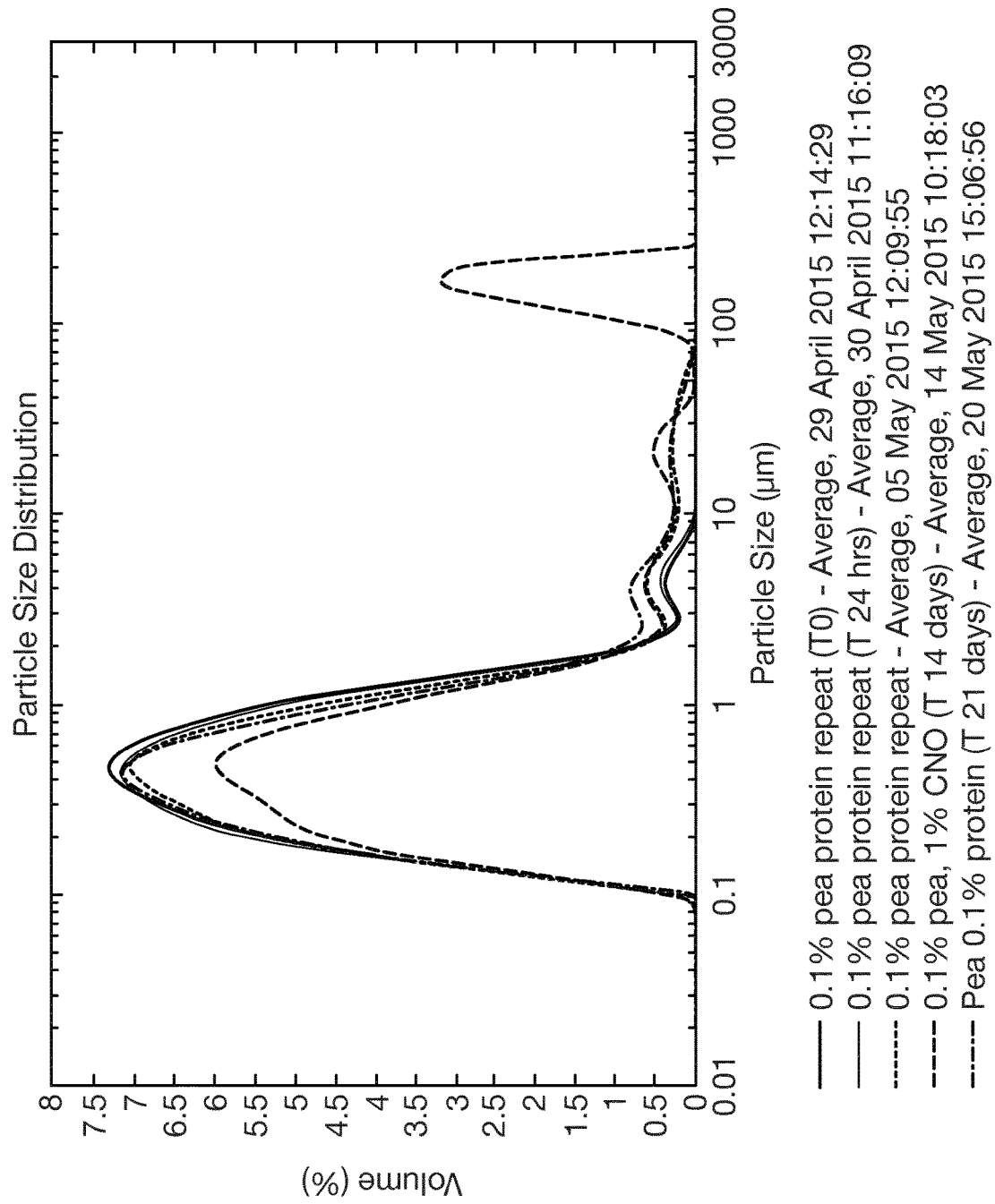

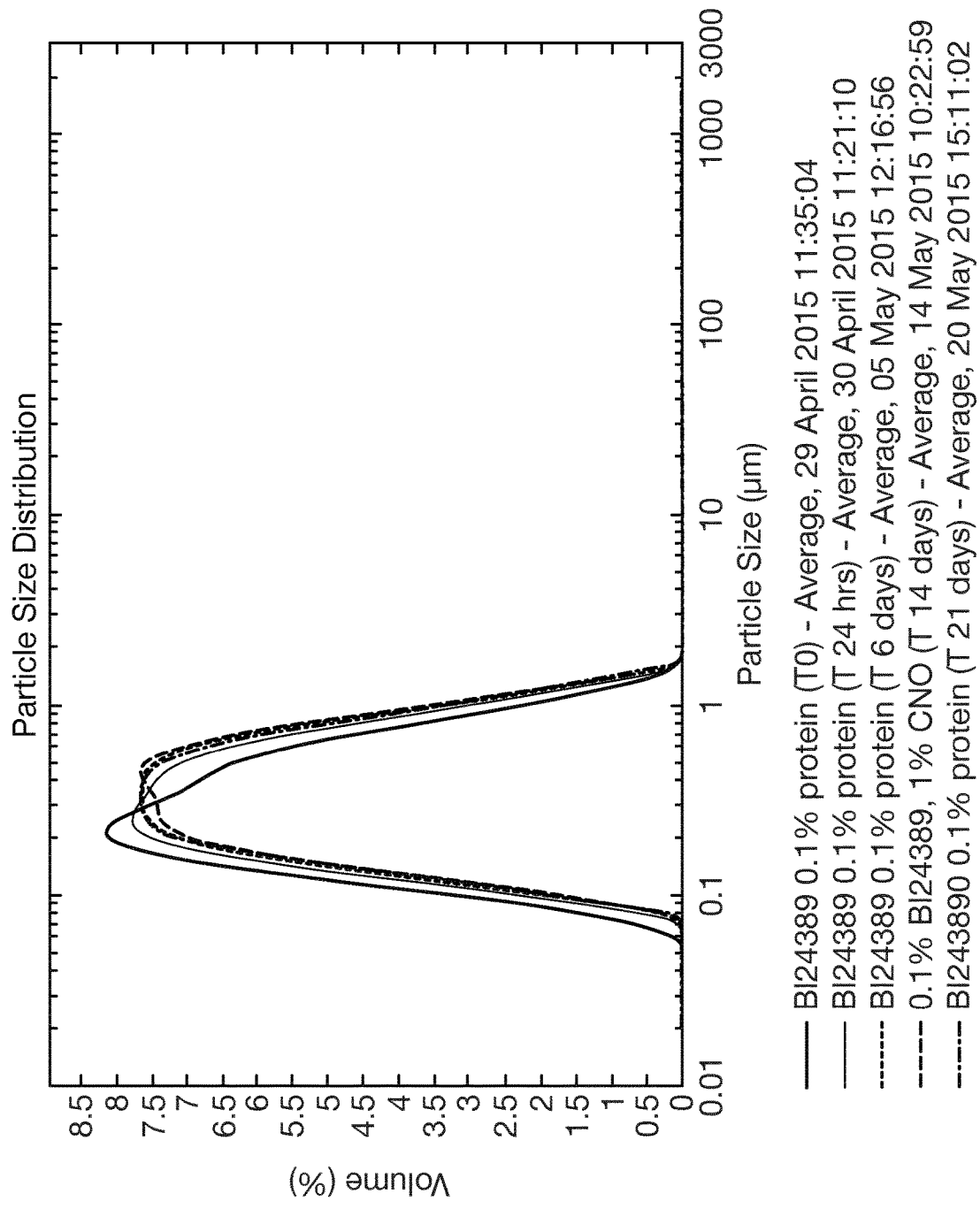

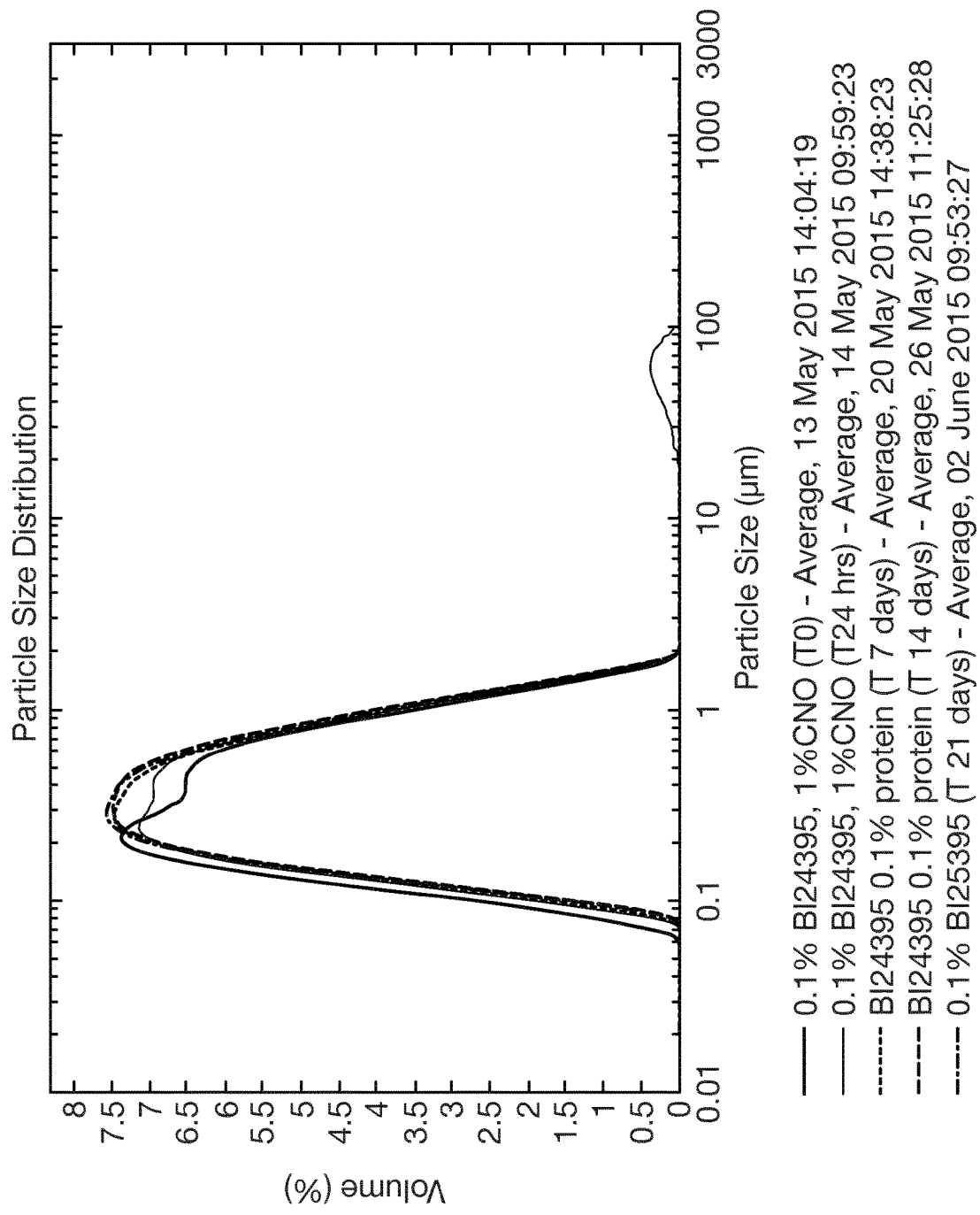

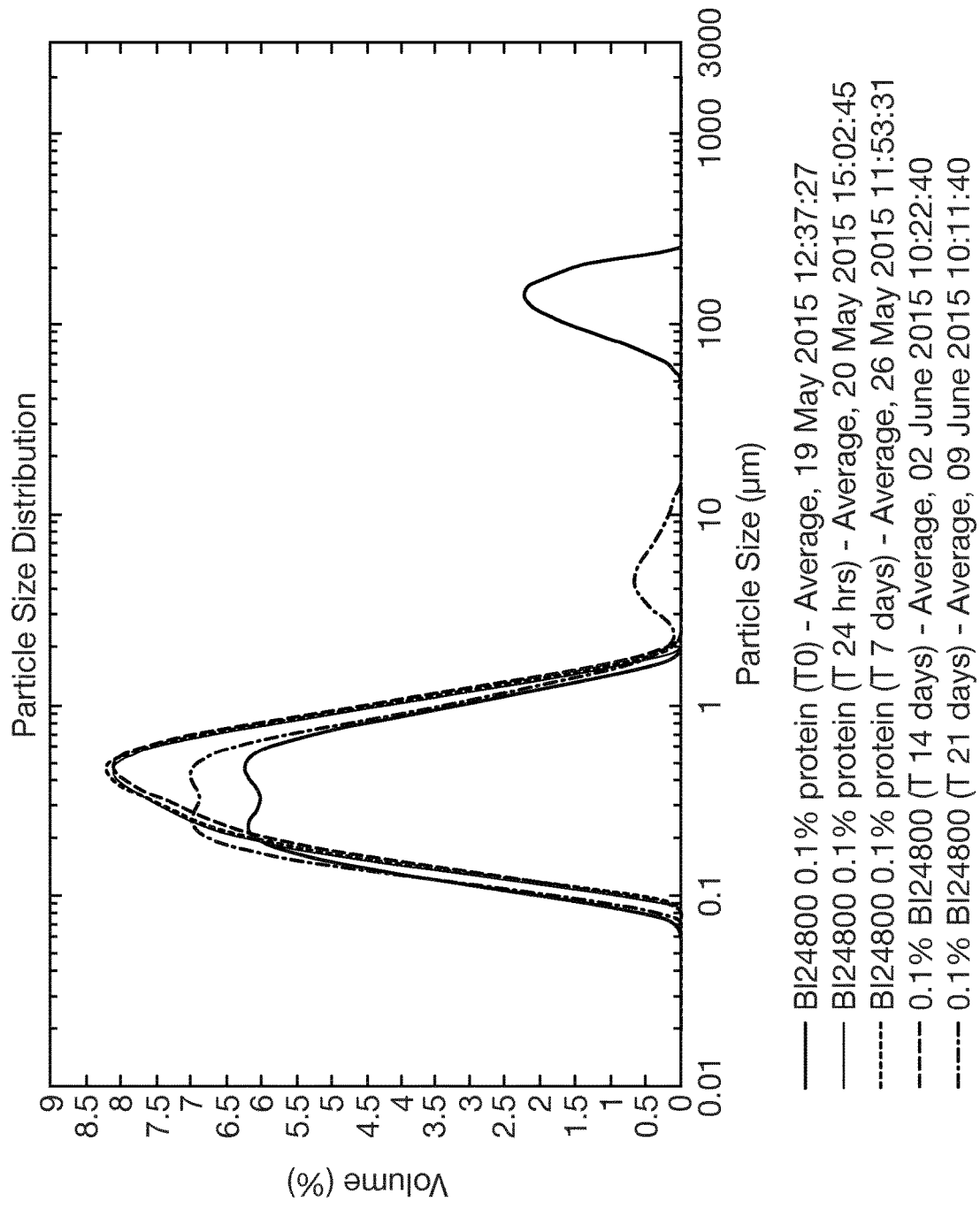

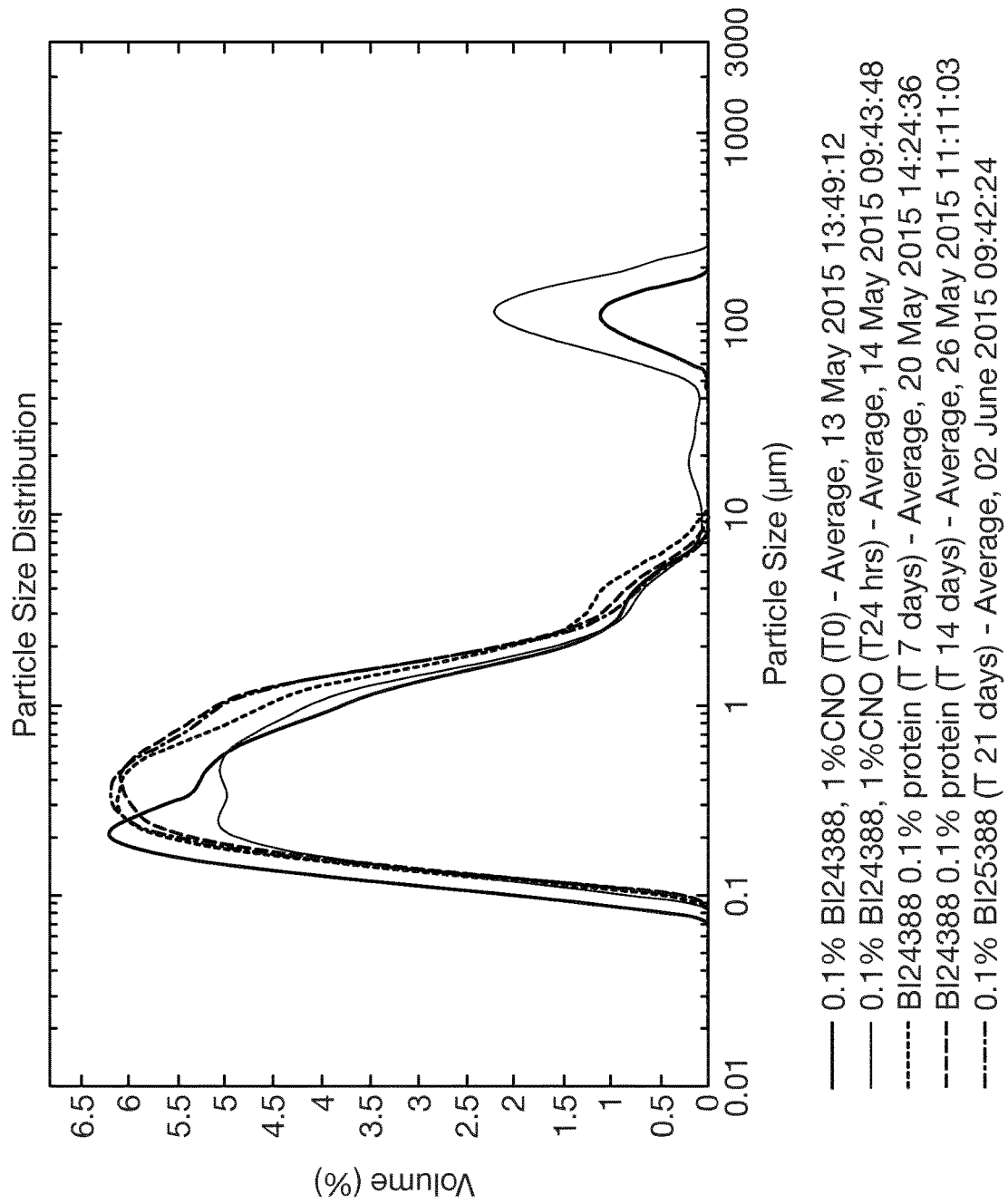

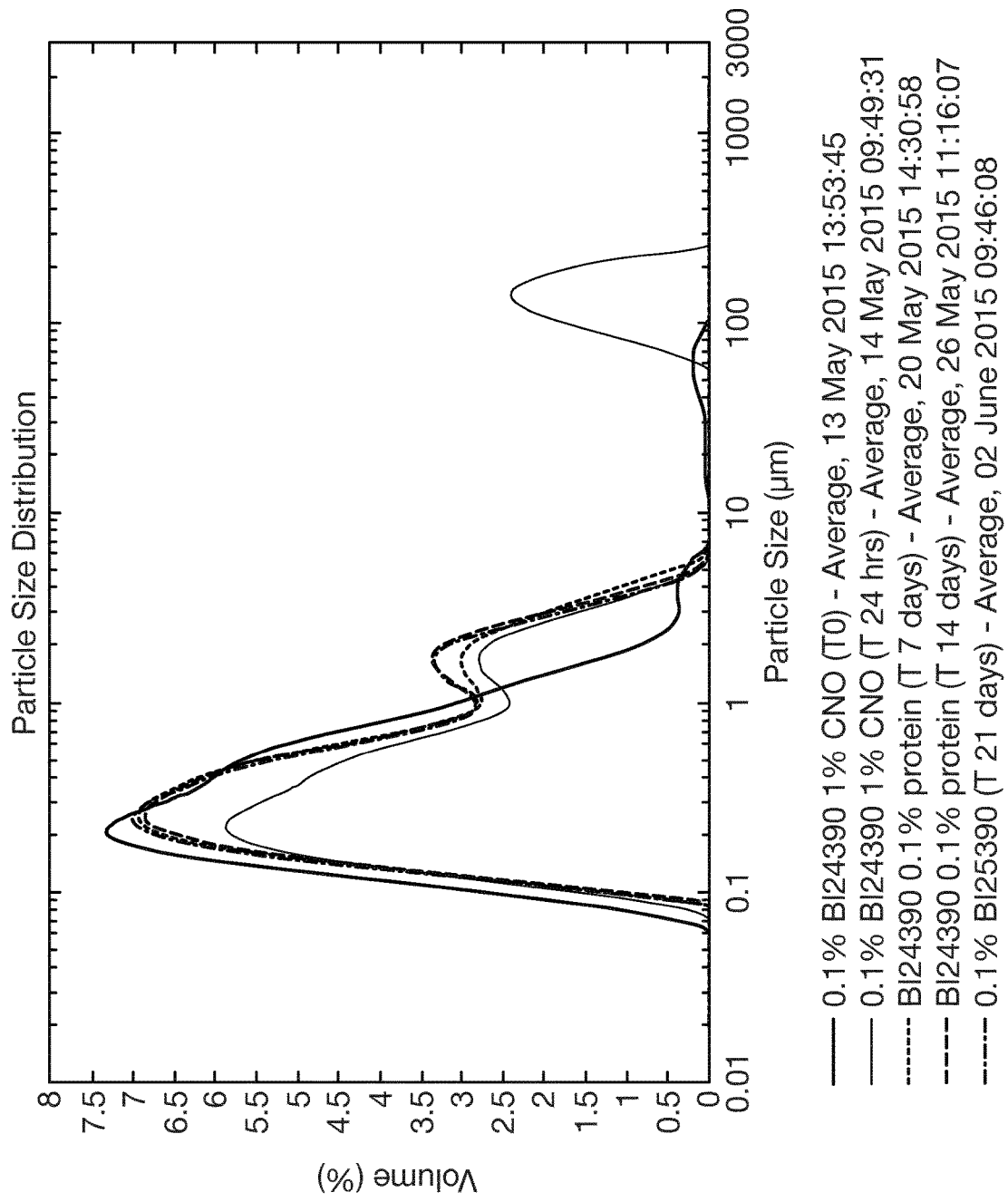

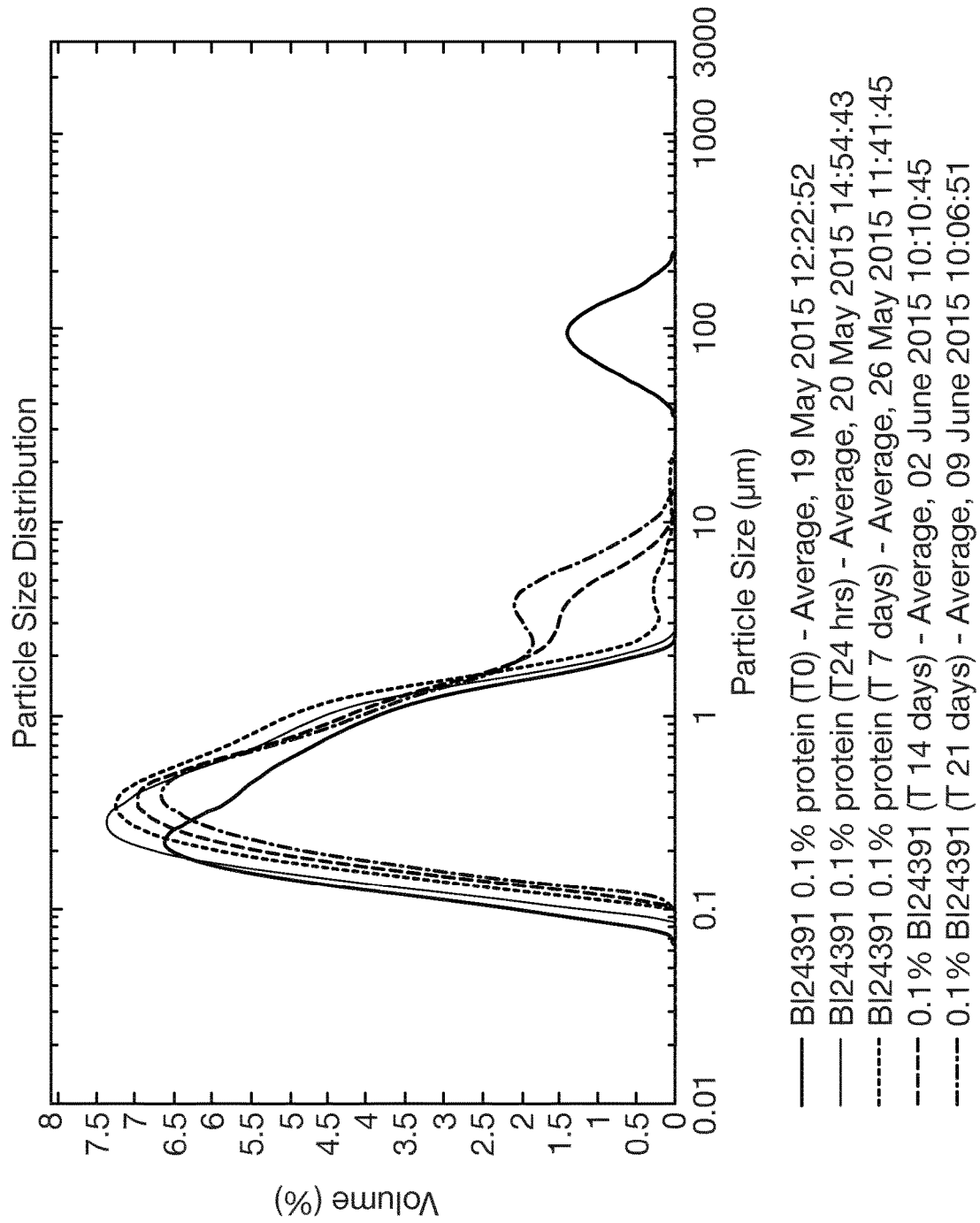

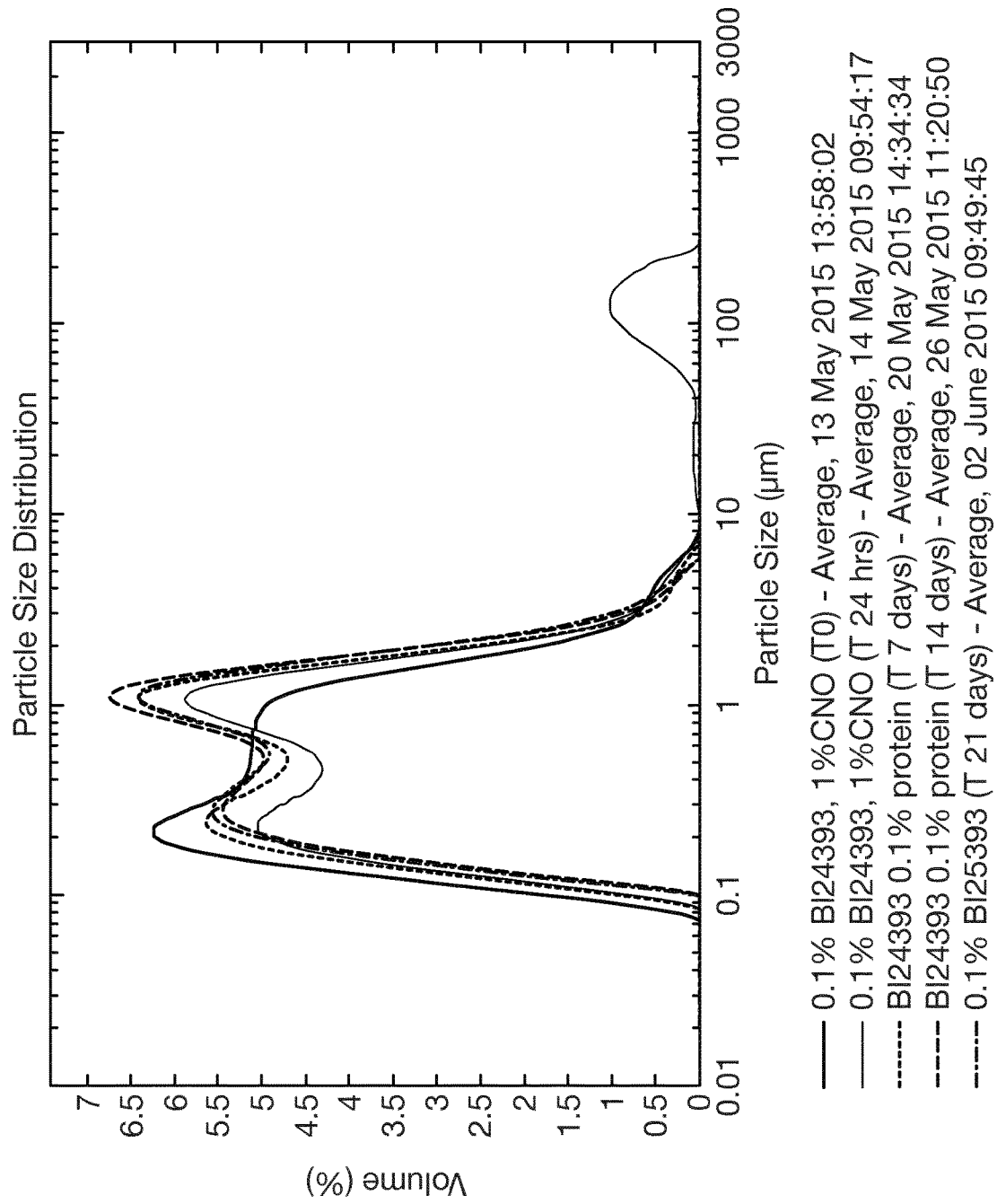

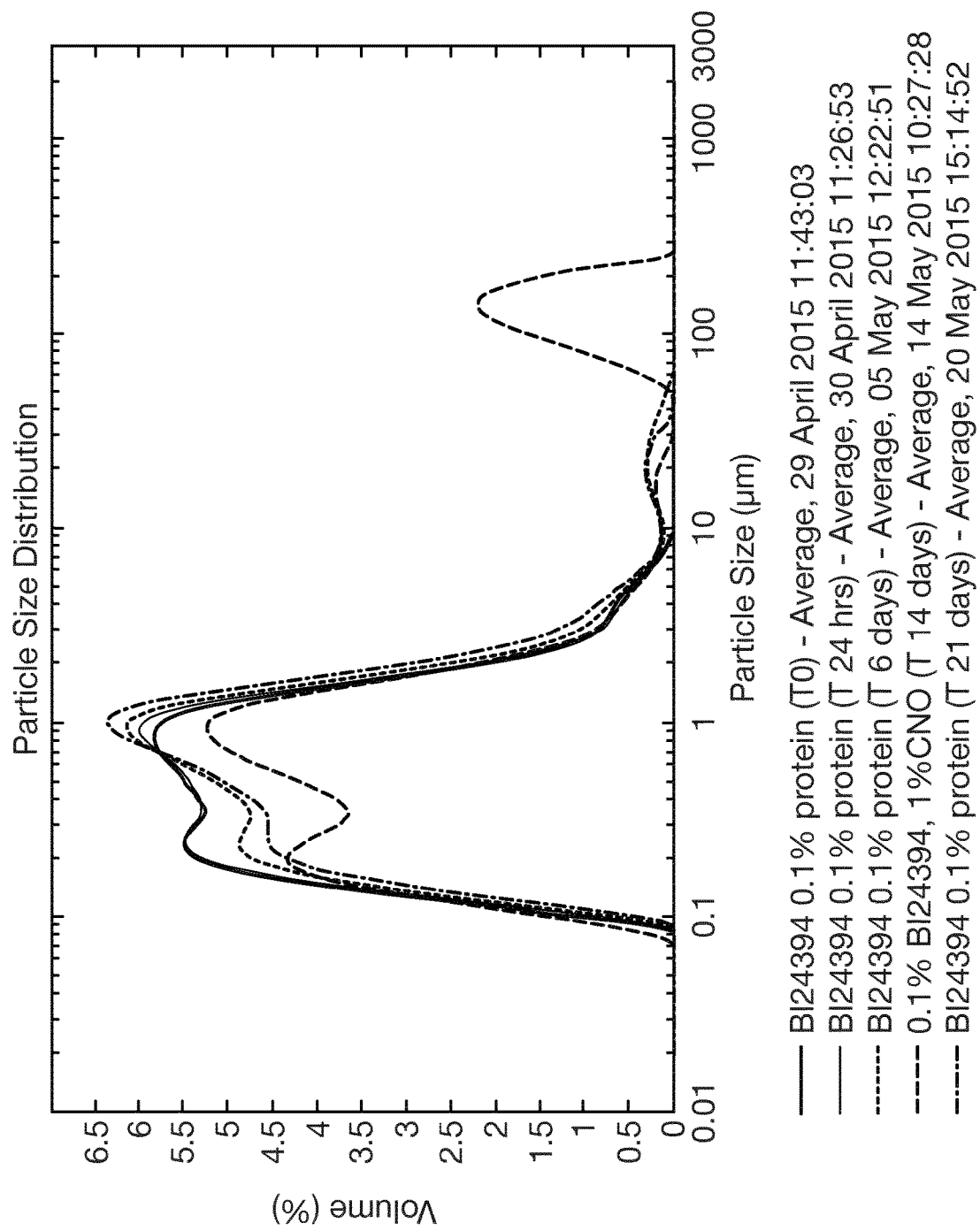

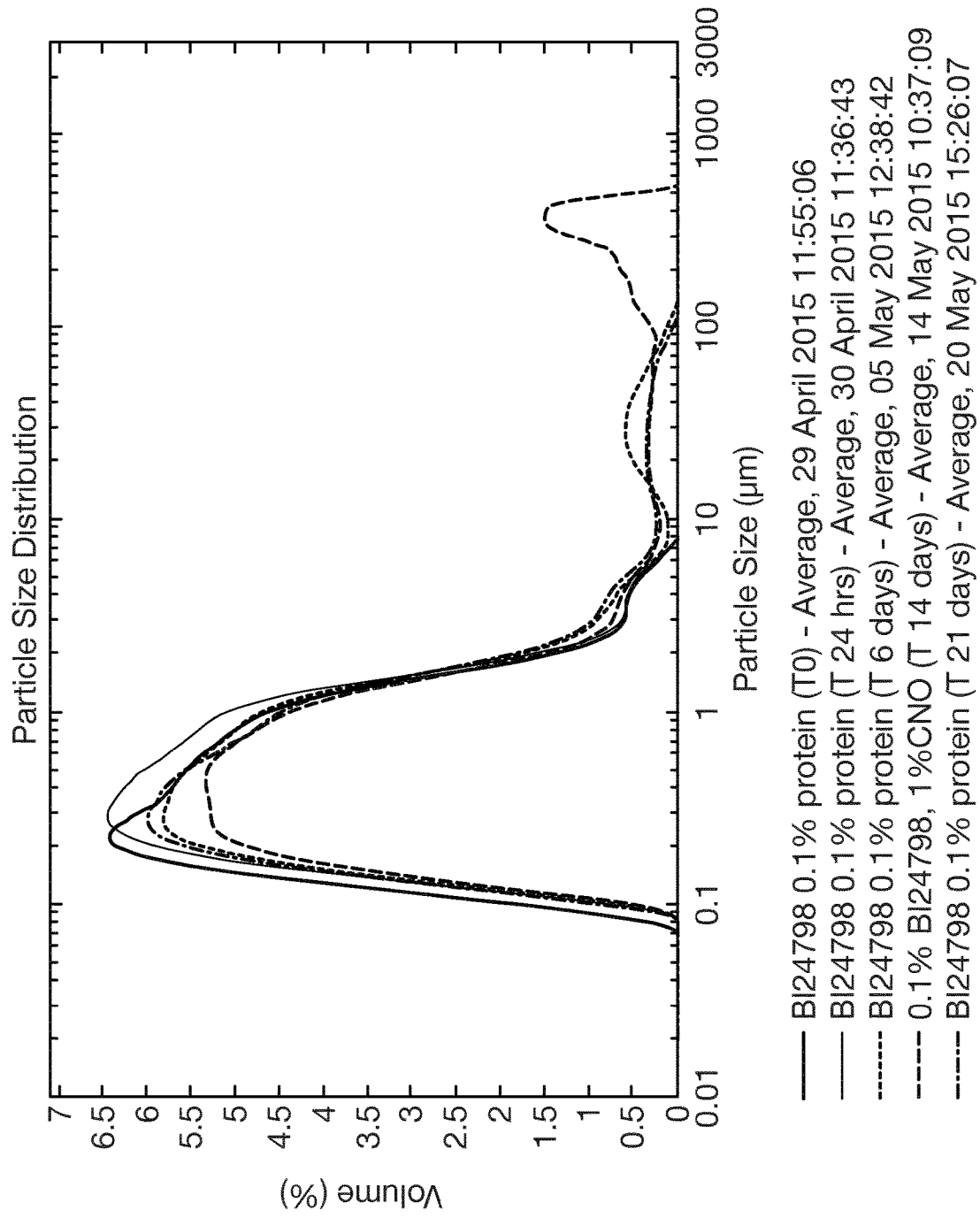
Fig. 1.10 - BI24798

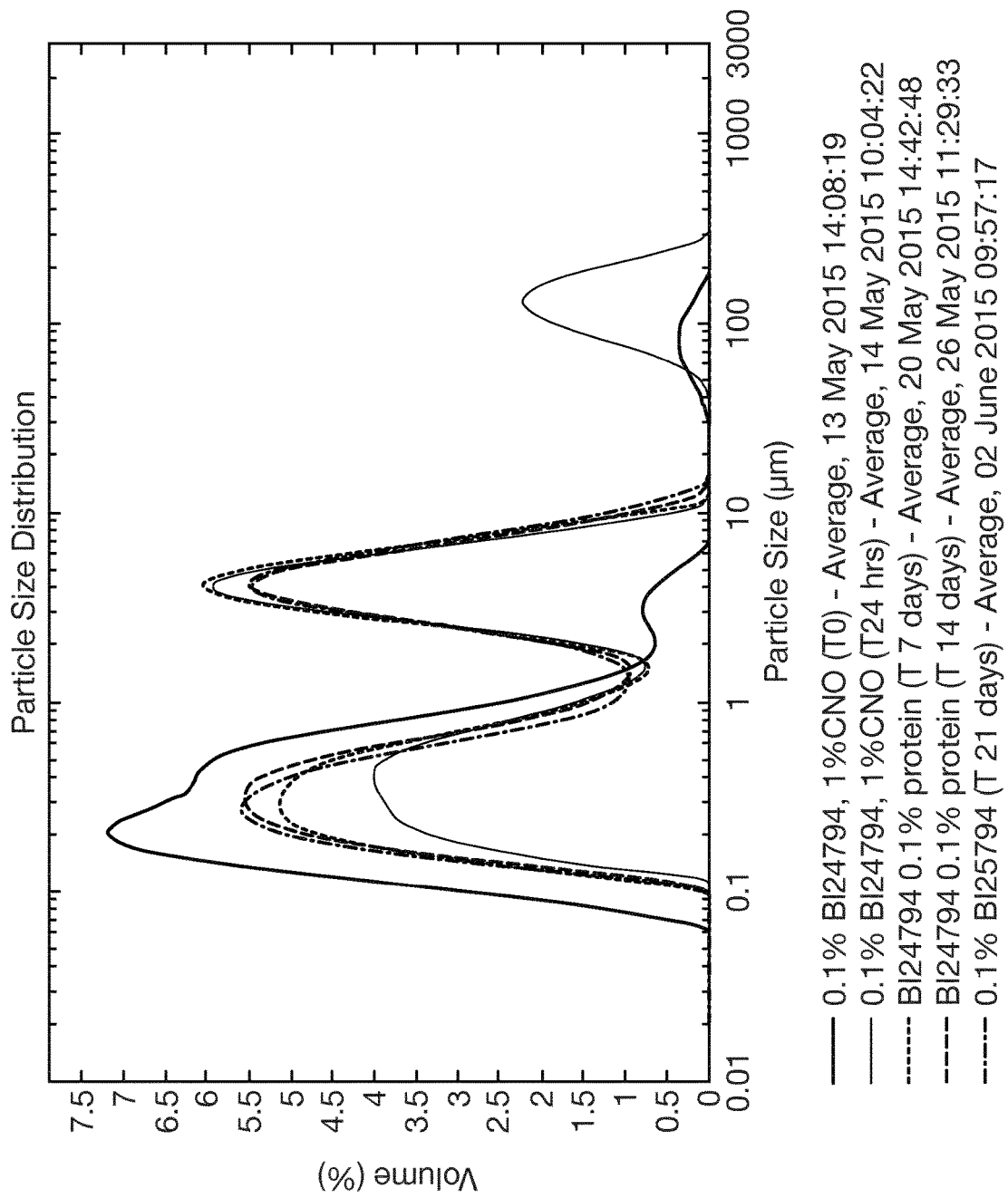

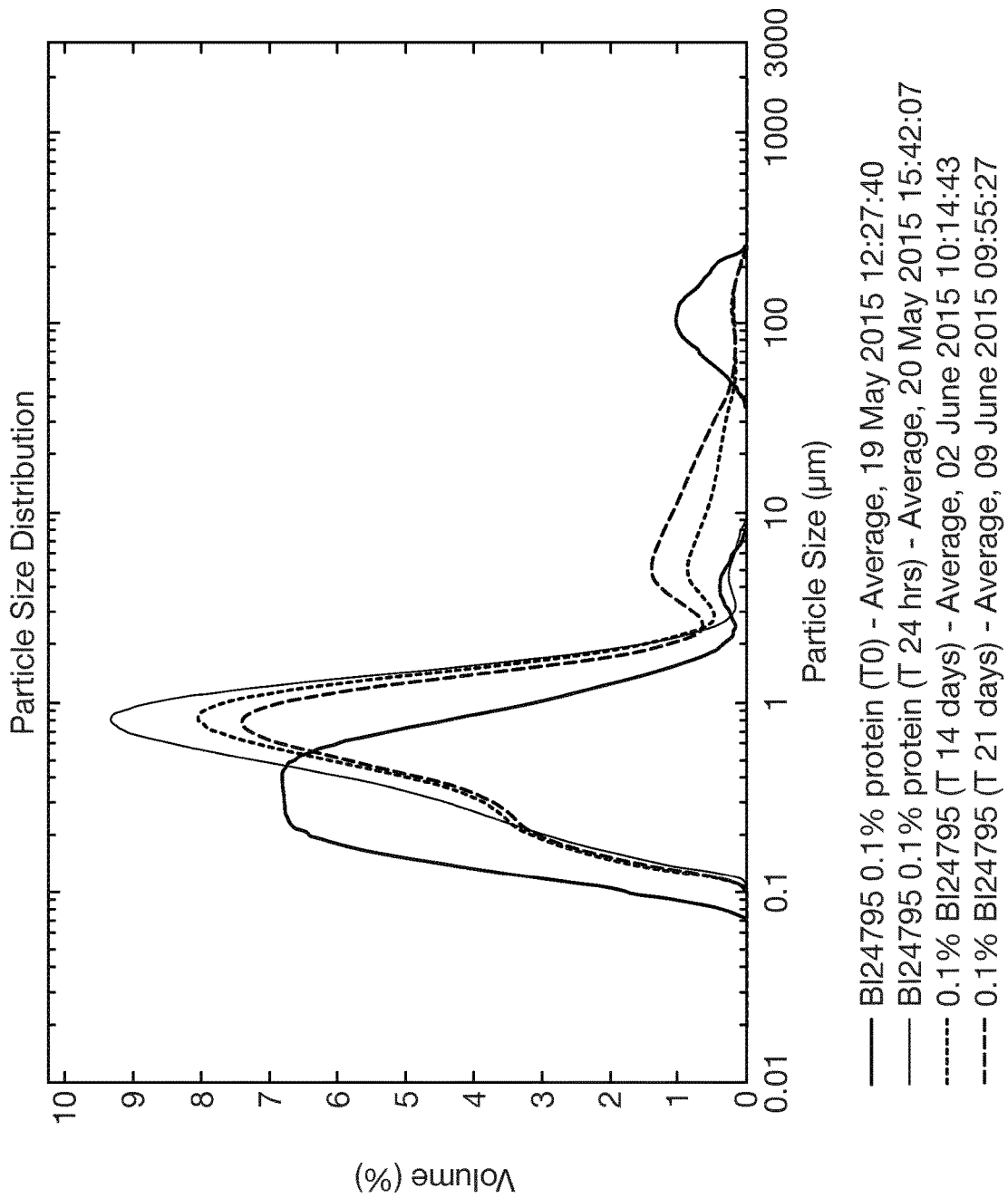
Fig. 1.12 - BI24795

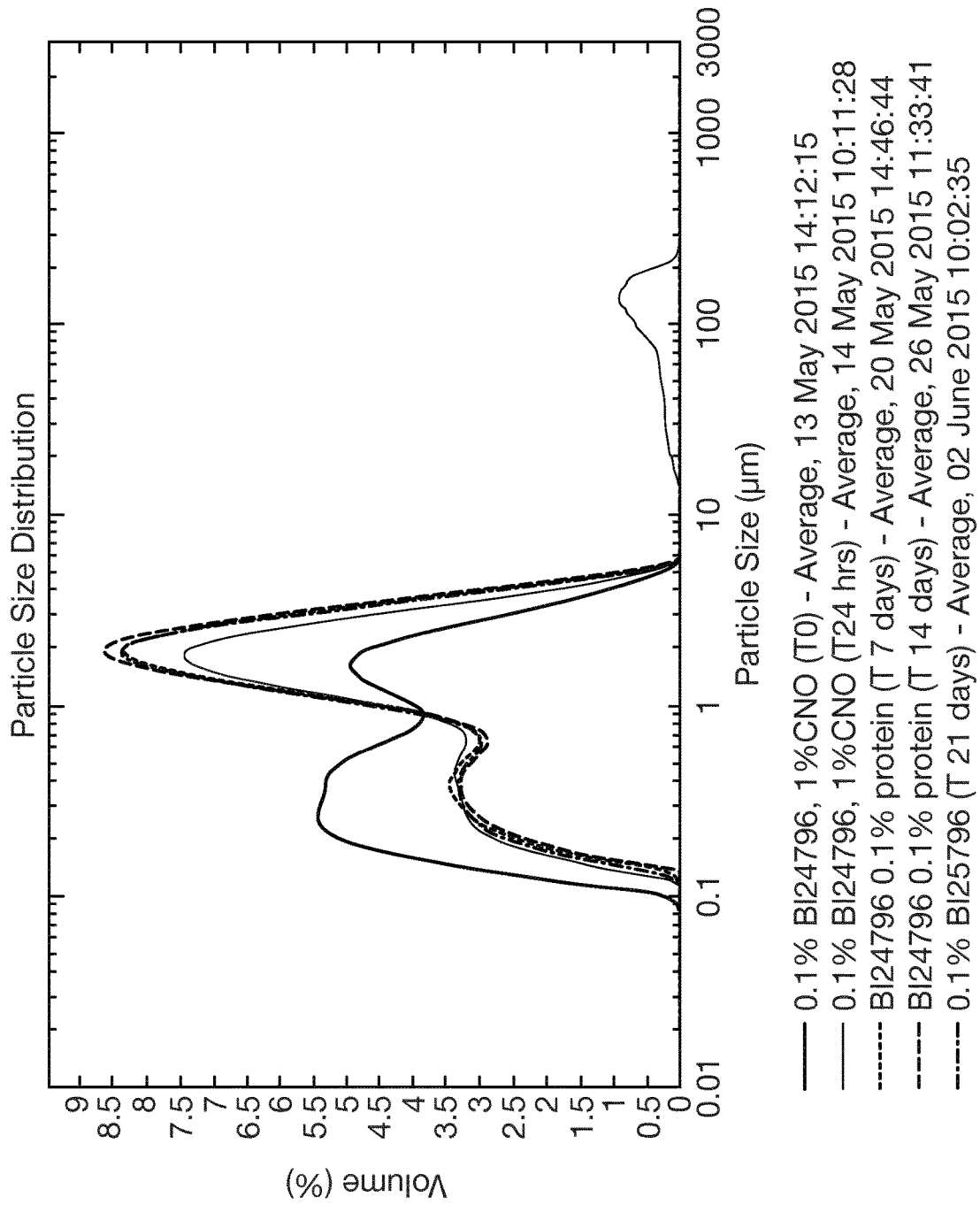

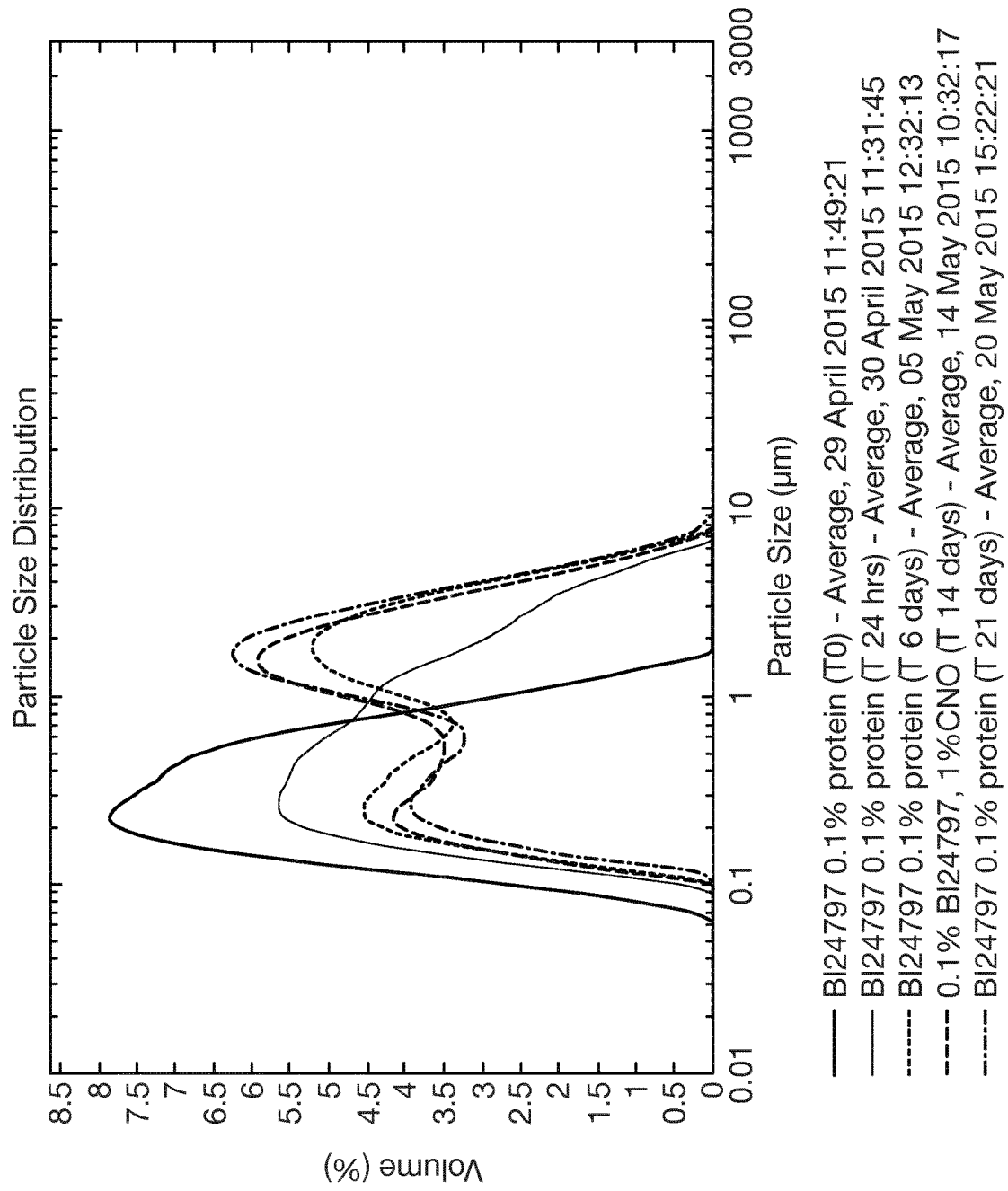

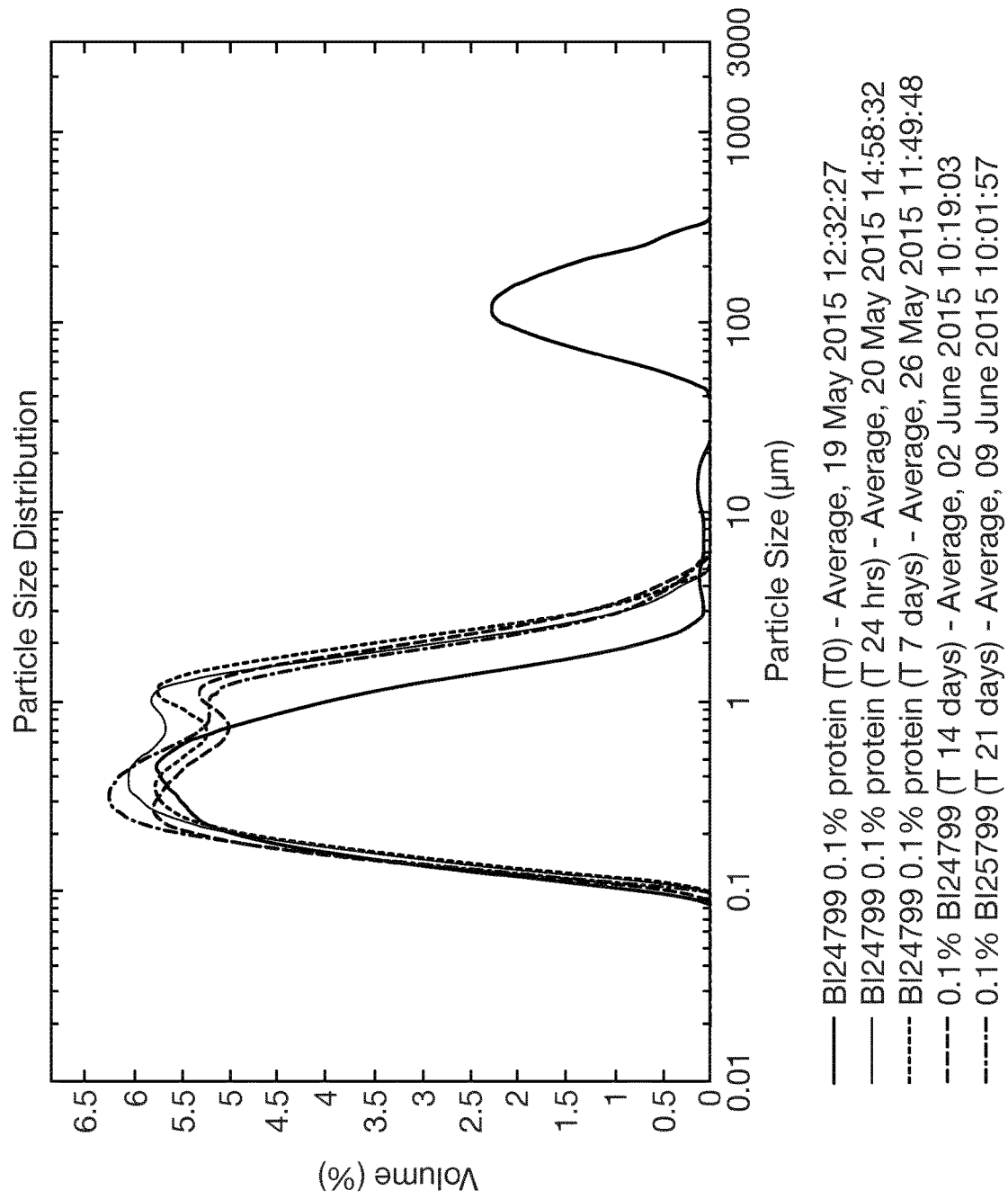

AERATED FOOD PRODUCTS

CROSS-REFERENCE TO RELATED APPLICATIONS

This application is a U.S. national phase application under 35 U.S.C. § 371 of International Application No. PCT/EP2017/079690, filed on Nov. 17, 2017, which claims priority to EP Patent Application No. 16203782.4, filed Dec. 13, 2016, the entire disclosures of which are incorporated herein by reference in their entireties, for any and all purposes.

FIELD OF THE INVENTION

The present invention relates to aerated food products that include mushroom extracts.

BACKGROUND TO THE INVENTION

A wide variety of food products contain introduced gas, such as air, nitrogen and/or carbon dioxide. Such foods include frozen and chilled food products, for example ice cream and mousses. Two key considerations arise in the production and storage of aerated food products, namely the ability to incorporate gas into the product during manufacture (foamability) and the subsequent stability of the gas bubbles during storage (foam stability). A number of additives are included in aerated food products to assist in the creation and maintenance of foam. These include proteins such as sodium caseinate and whey, which are highly foamable, and biopolymers, such as carrageenans, guar gum, locust bean gum, pectins, alginates, xanthan, gellan, gelatin and mixtures thereof, which are good stabilisers. However, although stabilisers used in the art can often maintain the total foam volume, they are poor at inhibiting the coarsening of the foam microstructure, i.e. increase in gas bubble size by processes such as disproportionation and coalescence. Further, many of the ingredients used to stabilise the gas phase in aerated food products need to be added at fairly high levels which can have deleterious textural and/or calorific consequences.

SUMMARY OF THE INVENTION

We have found that certain mushroom extracts combine high foamability and good foam stabilisation properties. In particular, extracts of the mushroom *Volvariella volvacea* have been found to provide both excellent foam volume stability and inhibition of coarsening. Further, the levels of *Volvariella volvacea* extract required to achieve excellent product stability are relatively low. It will therefore be possible to replace some or all of the conventional ingredients used to form and stabilise aerated food products with smaller amounts of *Volvariella volvacea* extract.

Accordingly, the present invention provides an aerated food product comprising extracts of the mushroom *Volvariella volvacea*. In a related aspect, the present invention provides an aerated food product in which the air phase is at least partially stabilised with extracts of the mushroom *Volvariella volvacea*.

In a preferred embodiment, the *Volvariella volvacea* extract is present in an amount of at least 0.001 wt %, more preferably at least 0.01 wt %.

In a related aspect, the present invention provides a composition for producing an aerated food product of the invention, which composition comprises *Volvariella volvacea* extract, together with at least one of the remaining ingredients of the food product. Preferably the composition comprises all the remaining ingredients of the food product.

In a related embodiment, the present invention provides a dry composition for producing an aerated food product of the invention, which composition comprises *Volvariella volvacea* extract, together with at least one of the remaining non-liquid ingredients of the food product. Preferably the composition comprises all the remaining non-liquid ingredients of the food product.

The present invention further provides the use of *Volvariella volvacea* extract in a method of inhibiting bubble coarsening in an aerated food product.

In a related aspect the present invention provides a method of inhibiting bubble coarsening in an aerated food product which method comprises adding *Volvariella volvacea* extract to the food product prior to and/or during aeration of the product.

The present invention also provides the use of *Volvariella volvacea* extract in a method of stabilising a foam in an aerated food product.

In a related aspect the present invention also provides a method of stabilising a foam in an aerated food product which method comprises adding *Volvariella volvacea* extract to the food product prior to and/or during aeration of the product.

The present invention further provides the use of *Volvariella volvacea* extract in a method of improving shape retention and/or rigidity in an aerated food product.

In a related aspect the present invention provides a method of improving shape retention and/or rigidity in an aerated food product which method comprises adding iii *Volvariella volvacea* extract to the food product prior to and/or during aeration of the product.

DETAILED DESCRIPTION OF THE INVENTION

Unless defined otherwise, all technical and scientific terms used herein have the same meaning as commonly understood by one of ordinary skill in the art (e.g. in chilled confectionery/frozen confectionery manufacture, chemistry and biotechnology). Definitions and descriptions of various terms and techniques used in chilled/frozen confectionery manufacture are found in Ice Cream, 4$^{th}$ Edition, Arbuckle (1986), Van Nostrand Reinhold Company, New York, N.Y.

Mushroom Extracts

The term 'mushroom' as used herein refers to the fruiting bodies of a number of different fungal species. Mushrooms represent an interesting opportunity for research into potentially novel ingredients. Commercially available vegetable proteins tend to be sourced from seeds, such as pea, lupin, canola and wheat. Although the protein profiles of seeds from different species vary in their properties, they generally contain a high proportion of globulin and albumin proteins. For example, different varieties of pea contain protein contents ranging from about 23-31%, with albumin and globulin representing 15-25% and 50-60% of the total protein respectively. Mushroom proteins however often differ from plant, microbial, and animal proteins, and therefore offer a source of potentially novel proteins with unique or interesting properties.

Mushrooms may also be particularly interesting from a sustainability point of view—they are saprotrophs which obtain their energy by degrading dead organic matter. Considerable amounts of this are generated as by-products of normal agricultural practices, in fact up to 90% of agricultural biomass is discarded as waste, with considerable environmental costs. Utilisation of some of this waste for mushroom cultivation therefore presents an opportunity to recycle waste products into the production of valuable food ingredients.

Mushrooms contain a relatively high total protein content—about 30-50% of different species on a dry weight basis, although they do also have a very high water content—up to 90%. The species investigated herein are all edible, with either culinary or medicinal uses, and are all currently cultivated and commercially available.

The *Volvariella volvacea* extract may be obtained in ways known to the person skilled in the art such as the extraction protocol described in Protein Purification Protocols (Methods in Molecular Biology, Vol. 244) 2nd Edition, Humana Press Inc, edited by: Paul Cutler, Chapter 5, "Protein Extraction from Fungi" by Paul D. Bridge, Tetsuo Kokubun, and Monique S. J. Simmonds.

Preferably the *Volvariella volvacea* extract is obtained by following the steps of:
1) Freeze drying the mushroom fruiting body then grinding;
2) Rehydrating the ground mushroom in a buffer, preferably a Tris-glycine buffer;
3) Clarifying soluble material by centrifugation, preferably at about 12500 g for about 40 minutes at about 4° C.;
4) Salting out soluble extracts out, preferably using saturated ammonium sulphate.
5) Centrifuging precipitates, preferably at about 12500 g for about 40 minutes at about 4° C. and then solubilising the pellets in distilled water;
6) Dialysing soluble protein against about 3 changes of distilled water using about 8000 KDa m.w. cut-off dialysis membrane;
7) Freeze drying the dialysed material to provide the *Volvariella volvacea* extract.

More preferably the *Volvariella volvacea* extract is obtained by following the steps of:
1) Freeze drying 20 g of the mushroom fruiting body and then grinding;
2) Rehydrating the ground mushroom by adding Tris-glycine buffer (3 g Trizma, 14.4 g glycine, 1 L deionized water, pH 8.3.);
3) Clarifying soluble material by centrifugation, preferably at about 12500 g, for about 40 minutes, at about 4° C.;
4) Salting out soluble extracts out using saturated ammonium sulphate.
5) Centrifuging precipitates preferably at about 12500 g, for about 40 minutes, at about 4° C. and then solubilising the pellets in distilled water;
6) Dialysing soluble protein against about 3 changes of distilled water using about 8000 KDa m.w. cut-off dialysis membrane;
7) Freeze drying the dialysed material to provide the *Volvariella volvacea* extract.

Aerated Food Products

Aerated food products of the invention typically fall into one of four groups—hot, ambient, chilled or frozen. The term "food" includes beverages. Hot food products include beverages such as cappuccino coffee. Ambient aerated food products include whipped cream, marshmallows and bakery products, e.g. bread. Chilled aerated food products include whipped cream, mousses and beverages such as beer, milk shakes and smoothies. Frozen aerated food products include frozen confections such as ice cream, milk ice, frozen yoghurt, sherbet, slushes, frozen custard, water ice, sorbet, granitas and frozen purees.

Preferably the aerated food product is an aerated confectionery product.

The term "aerated" means that gas has been intentionally incorporated into the product, such as by mechanical means. The gas can be any food-grade gas such as air, nitrogen or carbon dioxide. The extent of aeration is typically defined in terms of "overrun". In the context of the present invention, % overrun is defined in volume terms as:

$$((\text{volume of the final aerated product}-\text{volume of the mix})/\text{volume of the mix}) \times 100$$

The amount of overrun present in the product will vary depending on the desired product characteristics. For example, the level of overrun in ice cream is typically from about 70 to 100%, and in confectionery such as mousses the overrun can be as high as 200 to 250 wt %, whereas the overrun in water ices is from 25 to 30%. The level of overrun in some chilled products, ambient products and hot products can be lower, but generally over 10%, e.g. the level of overrun in milkshakes is typically from 10 to 40 wt %.

The amount of *Volvariella volvacea* extract present in the product will generally vary depending on the product formulation and volume of the air phase. Typically, the product will contain at least 0.001 wt %, *Volvariella volvacea* extract, more preferably at least 0.005 or 0.01 wt %. Typically the product will contain less than 1 wt % *Volvariella volvacea* extract. The *Volvariella volvacea* extract may be from a single source or a plurality of sources.

The present invention also encompasses compositions for producing an aerated food product of the invention, which composition comprises *Volvariella volvacea* extract. Such compositions include liquid premixes, for example premixes used in the production of frozen confectionery products, and dry mixes, for example powders, to which an aqueous liquid, such as milk or water, is added prior to or during aeration.

Such compositions include liquid premixes, for example premixes used in the production of frozen confectionery products, and dry mixes, for example powders, to which an aqueous liquid, such as milk or water, is added prior to or during aeration.

The compositions for producing a frozen food product of the invention, will comprise other ingredients, in addition to the *Volvariella volvacea* extract, which are normally included in the food product, e.g. sugar, fat, emulsifiers, flavourings etc. The compositions may include all of the remaining ingredients required to make the food product such that the composition is ready to be processed, i.e. aerated, to form an aerated food product of the invention.

Dry compositions for producing an aerated food product of the invention will also comprise other ingredients, in addition to the *Volvariella volvacea* extract, which are normally included in the food product, e.g. sugar, fat, emulsifiers, flavourings etc. The compositions may include all of the remaining non-liquid ingredients required to make the food product such that all that the user need only add an aqueous liquid, such as water or milk, and the composition is ready to be processed to form an aerated food product of the invention. These dry compositions, examples of which include powders and granules, can be designed for both industrial and retail use, and benefit from reduced bulk and longer shelf life.

The *Volvariella volvacea* extract is added in a form and in an amount such that it is available to stabilise the air phase. By the term "added", we mean that the *Volvariella volvacea* extract is deliberately introduced into the food product for the purpose of taking advantage of its foam stabilising properties. Consequently, where food ingredients are present or added that contain fungal contaminants, which may contain *Volvariella volvacea* or its extract, this does not constitute adding *Volvariella volvacea* extract within the context of the present invention.

Typically, the *Volvariella volvacea* extract is added to the food product in a form such it is capable of self-assembly at an air-liquid surface.

Typically, the *Volvariella volvacea* extract is added to the food product or compositions of the invention in an isolated form, typically at least partially purified, such as at least 10% pure, based on weight of solids. By "added in isolated form", we mean that the *Volvariella volvacea* extract is not added as part of a naturally-occurring organism, such as a mushroom, which may naturally contain native components of the *Volvariella volvacea* extract. Instead, the *Volvariella volvacea* extract will have been specifically extracted from the mushroom.

In one embodiment, the *Volvariella volvacea* extract is added to the aerated food product or compositions of the invention in an isolated form, typically at least partially purified.

The added *Volvariella volvacea* extract can be used to stabilise the air phase in an aerated food product, generally by inhibiting bubble coarsening, i.e. *Volvariella volvacea* extract or extracts has or have been found not only to stabilise foam volume but also the size of the bubbles within the foam.

The present invention will now be described further with reference to the following examples which are illustrative only and non-limiting.

DESCRIPTION OF THE FIGURES

FIGS. 1.1-1.15 show Mastersizer plots showing the particle size distribution for the fat droplets in the emulsions of the pea control, and the tested mushroom extracts.

EXAMPLES

Mushroom Samples

The mushrooms tested are provided in Table 1. The mushrooms are all edible, cultivated species available to purchase from outlets such as markets or grocery shops (especially in South and East Asia). Some are commonly used as culinary ingredients, whilst others are generally used medicinally (e.g the *Ganoderma* species). Mushrooms were sourced by researchers for the Royal Botanical Gardens at Kew, their identity was confirmed by DNA sequence analysis.

TABLE 1

| Mushrooms tested | | |
|---|---|---|
| ID | Species | Common name(s) |
| BI24388 | *Flammulina velutipes* | Enokitake, Winter Fungus, Velvet Shank |
| BI24389 | *Volvariella volvacea* | Paddy straw mushroom |
| BI24390 | A form of *Hipsizygus tessullates* | Beech mushroom |
| BI24391 | A further of *Hipsizygus tessullates* | Beech mushroom |
| BI24393 | *Pleurotus eryngii* | King oyster mushroom |
| BI24394 | *Clitocybes maxima* | |
| BI24395 | *Hyspatys marrcus* | |

TABLE 1-continued

| Mushrooms tested | | |
|---|---|---|
| ID | Species | Common name(s) |
| BI24794 | *Armillaria mellea* | Honey fungus |
| BI24795 | *Hericeum erinaceous* | Lions mane mushroom |
| BI24796 | unidentified cultivated sp | |
| BI24797 | *Pholiota nameko* | Butterscotch mushroom |
| BI24798 | *Lentinula edodes* | Shitake |
| BI24799 | *Auricularia auricula-judae* | Jelly ear |
| BI24800 | *Ganoderma lucidium* | Lingzhi or reishi mushroom |
| BI24801 | *Ganoderma applanatum* | Artist's conk |

Methods

Extract Preparation

Mushroom extracts were prepared as follows:
1) 20 g of the mushroom fruiting body was freeze dried and then ground. The grinding served to break open the cells of the mushroom.
2) Tris-glycine buffer (3 g Trizma, 14.4 g glycine, 1 L deionized water, pH 8.3.) was added to rehydrate the ground mushroom.
3) Soluble material was clarified by centrifugation, at 12500 g, for 40 minutes, at 4° C.
4) Soluble extracts were salted out using saturated ammonium sulphate.
5) Precipitates were centrifuged at 12500 g, for 40 minutes, at 4° C. and pellets solubilised in distilled water.
6) The soluble protein was then dialysed against about 3 changes of distilled water using 8000 KDa m.w. cut-off dialysis membrane.
7) Dialysed material was freeze dried to provide the mushroom extract.

Sample Rehydration

Mushroom extracts were re-constituted at a concentration of 10 mg per ml (1% w/v). The solvent used was either Milli Q water or MOPS buffer (25 mM, pH7.5). Samples were allowed to rehydrate at room temperature for 40 mins, followed by 30 mins heating at 70° C. Following centrifugation at 4,000 g for 10 mins the supernatants were filtered through 0.22 um syringe filters.

Control

A sample of commercially available dried yellow pea protein, Nutralys S85F (Roquette), was used as a control. The pea powder was reconstituted and prepared in MilliQ water the same way as the mushroom samples. As the protein had low solubility in buffer, this was not used. The pea protein samples were therefore diluted with concentrated buffer before use to give the required protein concentration in a solution of 25 mM MOPS.

Total Protein Assay

The total protein content in the re-constituted samples was measured using the Pierce BCA protein assay (Life Technologies, 23227) according to instructions. A standard curve was run with every assay, and the standard protein was Bovine Serum Albumin (supplied with the assay kit). Samples were diluted 1 in 10 for assay.

Additional protein assays applied to some of the samples were the reducing agent compatible version of the BCA assay (Life Technologies, 23252) and Fluoraldehyde™ o-Phthaldialdehyde Reagent Solution (OPA) assay, (Life Technologies 26025)—both used according to the manufacturer's instructions.

Emulsion Preparation

Small scale (10 g) emulsions were prepared in 20 ml glass vials (O.D×H 28×61 mm). Protein was 0.1% (1 mg/ml) based on the BCA protein assay data and fat was 1% coconut oil (CNO). Samples were reconstituted and prepared in buffer (s described above, and the total protein content measured by BCA assay. The samples were assessed for particle size (at 0.5 mg/ml). They were diluted (using 25 mM MOPS pH7.5) to 0.1% protein and warmed to about 52° C. in an oven. 9.9 g of the protein solution and 0.1 g of warmed CNO were combined and the vial maintained in a 40° C. oven until the emulsion was prepared (<1 hour). Homogenisation was achieved using a Branson Digital Sonifier 450 equipped with a ½" diameter tapped Bio Horn and a ½" diameter flat tipped extension. The setting used was 65% amplitude for 15 seconds, followed by another 15 second sonication. The vial was maintained in an ice and water bath during the sonication, and was mixed by inversion between the two bursts of sonication. The emulsion was cooled in an ice bath, and the fat droplet size assessed within an hour.

Emulsion Droplet Size Assessment

The fat droplet size of the emulsions was assessed by static light scattering using a Mastersizer (Malvern Instruments). The instrument was set to determine particles as coconut oil and the dispersant as water. Emulsions were dropped into the sample cell until sufficient sample was added to give 10-20% obscuration. The sample stirrer was set at 2000 rpm, and 3 consecutive measurements were taken for each sample and mean data derived from these.

Emulsion Stability

The fat droplet size of the emulsions was assessed when the samples were freshly made, after 24 hours and after 1, 2 and 3 weeks. Emulsions were stored at room temperature, and sodium azide was added to 0.02% as an anti-microbial agent.

Interfacial Property Measurements

Two mushrooms were selected for further study of their interfacial properties, BI24389 (*Volvariella volvacea*) and BI24395 (*Hyspatys marrcus*). The samples were re-solubilised as before in buffer and diluted using buffer to 0.005% (w/v) based on BCA assay data. Interfacial tension and surface elasticity were measured for both samples.

Reported values of interfacial tension and surface elastic modulus in the low frequency range (up to 0.2 Hz) were measured using the Drop Shape tensiometer PAT-1 (Sinterface, Germany). The measuring configuration was that of a bubble emerging from a J-shaped capillary positioned inside the cell containing the protein solution.

The PAT-1 tensiometer implements a feature allowing for an accurate control of the bubble interfacial area with the possibility of either keeping it constant (kinetics study of surface active species adsorbed at constant interfacial area) or varying it during the measurement according to predetermined patterns. The latter feature is utilised in the oscillating bubble method for the measurement of the dilational viscoelasticity. To this aim, purely harmonic oscillations with small amplitude and frequency of the bubble interfacial area are imposed while the surface tension response is measured. From the amplitude of the two signals and the phase shift between them, the elastic and viscous components of dilational viscoelasticity are calculated by standard Fourier analysis techniques. The surface elastic modulus is presented here, which was the dominant component. In the experiments reported here an air bubble of area A0=18 mm2 was formed at the tip of a J-shaped capillary in a glass cell containing about 26 ml of the protein solution. An area variation of 5% was imposed during oscillations (18±0.9 mm2) in the frequency range between 0.005 and 0.2 Hz. The latter frequency is close to the upper limit of utilisation of the oscillating bubble method in a Drop Shape tensiometer, which in fact requires an equilibrium drop shape to be attained for correct measurements.

Results

Sample Rehydration

The mushroom samples (all at a concentration of 10 mg/ml of the freeze-dried extracts) were heated to 70° C. during the re-constitution to help inactivate enzymes and solubilise the dried material. This is a harsh treatment for proteins but any protein sample used in ice cream processing would be exposed to these temperatures during pasteurisation, and therefore the properties of the sample after heat treatment are relevant. Although the mushroom samples were all initially soluble extracts (prior to freeze drying), none of them fully resolubilised and the remaining insoluble material was removed by centrifugation. The measured protein content (BCA assay) was in all cases much lower than 10 mg/ml (the amount of powder weighed out), and ranged from about 2-5 mg/ml. The amount of protein measured after reconstitution in water or buffer was compared for all samples, and was routinely higher in the buffer solubilised samples. The reverse situation was true for the pea control, where very little protein solubilised into the buffer.

Total Protein Assay

The BCA assay was used during these experiments to assess the total protein concentration. Results are shown in Table 2.

TABLE 2

Total protein measured by BCA assay in all the samples following resolubilisation.

| Sample | Water (protein mg/ml) | Buffer (protein mg/ml) |
| --- | --- | --- |
| BI24388 | 1.8 | 4.2 |
| BI24389 | 4.2 | 5.8 |
| BI24390 | 1.9 | 3.3 |
| BI24391 | 1.4 | 2.1 |
| BI24393 | 1.5 | 3.4 |
| BI24394 | 0.8 | 2.7 |
| BI24794 | 2.6 | 3.9 |
| BI24395 | 1.2 | 2.3 |
| BI24795 | 1.7 | 2.1 |
| BI24796 | 2.1 | 3.1 |
| BI24797 | 1.8 | 4.6 |
| BI24798 | 1.9 | 4.6 |
| BI24799 | 1.5 | 2.8 |
| BI24800 | 4.5 | 5.5 |
| BI24801 | 1.8 | 1.9 |
| Pea | 3 | 1.3 |

Emulsion Preparation and Stability

Emulsions were prepared from all the mushroom samples (except BI24801, as there was insufficient sample). The emulsions were made in three separate batches, and a pea control was carried out alongside each batch. The pH of the emulsions was fixed to be in the neutral region, as this is closer to the pH values of regular dairy ice cream than the low natural pH values of the mushroom extracts. Fixing the pH also provided some consistency of the test conditions from sample to sample. Therefore the samples were re-constituted in buffer at pH 7.5, and in all cases the actual pH of the solution was in the region of pH 7-7.4. The emulsification was achieved by ultrasound, using a Branson Sonicator. Fat droplet size was measured immediately after emulsification, and then at various times up to 3 weeks afterwards to assess stability.

In all cases, an initial emulsion was formed, and in most cases droplet sizes were comparable to the pea control. The emulsions (including the control) were all relatively thin and non-viscous by appearance due to the low level of protein and fat, and the lack of additional ingredients such as sugar or gums. Some samples therefore had a tendency to cream after standing for several days. However, gentle hand mixing rapidly remixed the samples.

Results are shown in Table 3.

TABLE 3

Stability of emulsions prepared using pea (control) and mushroom extracts.

| | D (3, 2) um | D (4, 3) um | | D (3, 2) um | D (4, 3) um | | D (3, 2) um | D (4, 3) um |
|---|---|---|---|---|---|---|---|---|
| Pea | | | BI24388 | | | BI24794 | | |
| T0 | 0.376 | 0.664 | T0 | 0.322 | 6.286 | T0 | 0.267 | 2.422 |
| 24 hrs | 0.374 | 0.681 | 24 hrs | 0.421 | 17.046 | 24 hrs | 0.68 | 20.607 |
| 6 days | 0.384 | 1.543 | 7 days | 0.379 | 0.878 | 7 days | 0.5 | 2.206 |
| 14 days | 0.445 | 23.58 | 14 days | 0.39 | 0.832 | 14 days | 0.494 | 2.147 |
| 21 days | 0.391 | 1.542 | 21 days | 0.382 | 0.791 | 21 days | 0.485 | 2.275 |
| BI24389 | | | BI24390 | | | BI24795 | | |
| T0 | 0.235 | 0.363 | T0 | 0.269 | 1.12 | T0 | 0.319 | 8.763 |
| 24 hrs | 0.268 | 0.408 | 24 hrs | 0.364 | 19.542 | 24 hrs | | |
| 6 days | 0.283 | 0.43 | 7 days | 0.335 | 0.796 | 7 days | 0.532 | 0.895 |
| 14 days | 0.287 | 0.436 | 14 days | 0.338 | 0.784 | 14 days | 0.533 | 3.387 |
| 21 days | 0.283 | 0.431 | 21 days | 0.328 | 0.753 | 21 days | 0.391 | 0.771 |
| BI24395 | | | BI24391 | | | BI24796 | | |
| T0 | 0.261 | 0.426 | T0 | 0.309 | 9.068 | T0 | 0.416 | 0.976 |
| 24 hrs | 0.293 | 1.597 | 24 hrs | 0.317 | 0.529 | 24 hrs | 0.687 | 8.282 |
| 7 days | 0.291 | 0.459 | 7 days | 0.366 | 0.675 | 7 days | 0.729 | 1.555 |
| 14 days | 0.299 | 0.467 | 14 days | 0.403 | 0.915 | 14 days | 0.762 | 1.592 |
| 21 days | 0.296 | 0.462 | 21 days | 0.443 | 1.198 | 21 days | 0.712 | 1.535 |
| BI24800 | | | BI24393 | | | BI24797 | | |
| T0 | 0.318 | 18.161 | T0 | 0.271 | 0.444 | T0 | 0.246 | 0.397 |
| 24 hrs | 0.326 | 0.492 | 24 hrs | 0.413 | 9.557 | 24 hrs | 0.399 | 0.969 |
| 7 days | 0.334 | 0.503 | 7 days | 0.379 | 0.777 | 6 days | 0.505 | 1.395 |
| 14 days | 0.337 | 0.516 | 14 days | 0.427 | 0.833 | 14 days | 0.518 | 1.361 |
| 21 days | 0.299 | 0.661 | 21 days | 0.417 | 0.833 | 21 days | 0.592 | 1.518 |
| | | | BI24394 | | | BI24799 | | |
| | | | T0 | 0.372 | 0.802 | T0 | 0.413 | 24.003 |
| | | | 24 hrs | 0.381 | 0.804 | 24 hrs | 0.42 | 0.791 |
| | | | 6 days | 0.414 | 1.419 | 7 days | 0.431 | 0.851 |
| | | | 14 days | 0.432 | 18.55 | 14 days | 0.395 | 0.822 |
| | | | 21 days | 0.445 | 1.323 | 21 days | 0.392 | 0.766 |
| | | | BI24798 | | | | | |
| | | | T0 | 0.318 | 0.667 | | | |
| | | | 24 hrs | 0.361 | 0.72 | | | |
| | | | 6 days | 0.391 | 2.873 | | | |
| | | | 14 days | 0.437 | 28.24 | | | |
| | | | 21 days | 0.378 | 2.156 | | | |

As can be seen from Table 3 and in FIGS. 1.1-1.15, the extracts of BI24389 (*Volvariella volvacea*), BI24395 (*Hyspatys marrcus*), and BI24800 (*Ganoderma lucidium*) provided stable emulsions, comparable to pea whereas the remaining mushroom extracts did not.

Interfacial Property Measurements

The two samples selected for interfacial property measurements were BI24389 and BI24395. Both formed good, stable emulsions, but had some different physical properties. For example, in 25 mM MOPS at ~pH7.5 the zeta potential of BI24389 was in the region of −30 mV while for 395 it was closer to −8 mV. BI24395 was the most surface active of the two mushroom samples, giving a surface tension at the air-water interface of 40 mN/m after 2 hours, compared to 55 mN/m for the BI24389. For comparison, pea and SMP gave values of between 50 and 55 mN/m when analysed in the same manner, suggesting that out of this set of proteins BI24395 would likely exhibit the best foaming ability and smallest bubble size. The elastic modulus at high frequency of both the mushroom samples was greater than that of SMP, and similar to pea—with values of close to 20 mN/m for SMP, almost 40 for BI24395, 45 for pea and 50 for BI24389. The higher the modulus at high frequency the better the sample will stop bubble disproportionation. The data suggest that both of these mushroom samples will form good ice cream structures, equivalent to pea and SMP.

The various features and embodiments of the present invention, referred to in individual sections above apply, as appropriate, to other sections, mutatis mutandis. Consequently, features specified in one section may be combined with features specified in other sections, as appropriate.

All publications mentioned in the above specification are herein incorporated by reference. Various modifications and variations of the described methods and products of the invention will be apparent to those skilled in the art without departing from the scope of the invention. Although the invention has been described in connection with specific preferred embodiments, it should be understood that the invention as claimed should not be unduly limited to such specific embodiments. Indeed, various modifications of the described modes for carrying out the invention which are apparent to those skilled in the relevant fields are intended to be within the scope of the following claims.

The invention claimed is:

1. An aerated food product comprising at least 0.001 wt % *Volvariella volvacea* fruiting body protein extract and
an emulsion or a foam comprising a volume average diameter of less than about 0.5 μm;
wherein said extract stabilizes the volume average diameter of the emulsion or the foam in the aerated food product.

2. The aerated food product of claim 1 comprising at least 0.01 wt % *Volvariella volvacea* fruiting body protein extract.

3. The aerated food product of claim 1 comprising at least 0.005 wt % *Volvariella volvacea* fruiting body protein extract.

4. The aerated food product of claim 1, wherein the *Volvariella volvacea* fruiting body protein extract is prepared by:
   Freeze drying the *Volvariella volvacea* fruiting body then grinding;
   Rehydrating the ground *Volvariella volvacea* fruiting body in a buffer;
   Clarifying soluble material by centrifugation;
   Salting out soluble extracts;
   Centrifuging precipitates to form pellets and then solubilising the pellets in distilled water;
   Dialysing soluble protein; and
   Freeze drying the dialysed material to provide the *Volvariella volvacea* fruiting body protein extract.

5. The aerated food product of claim 1, wherein the aerated food product is a frozen food product.

6. The aerated food product of claim 1, wherein the aerated food product is a chilled food product.

7. The aerated food product of claim 1, wherein the aerated food product is an aerated confectionery product.

8. A method of preparing an aerated food product comprising adding sufficient *Volvariella volvacea* fruiting body protein extract to the food product prior to and/or during aeration of the food product to form an emulsion or a foam comprising a volume average diameter of less than about 0.5 µm; wherein at least 0.001 wt % *Volvariella volvacea* fruiting body extract is added to the food product, and said extract stabilizes the volume average diameter of the emulsion or the foam in the aerated food product.

9. The aerated food product of claim 1 comprising 0.001 wt % to less than 1 wt % *Volvariella volvacea* fruiting body protein extract.

10. The aerated food product of claim 1, wherein the extract inhibits bubble coarsening in the aerated food product; improves shape retention, and/or improves rigidity in the aerated food product.

* * * * *

UNITED STATES PATENT AND TRADEMARK OFFICE
CERTIFICATE OF CORRECTION

PATENT NO. : 11,785,964 B2
APPLICATION NO. : 16/461898
DATED : October 17, 2023
INVENTOR(S) : Sarah Twigg and Stephen Wilson It is certified that error appears in the above-identified patent and that said Letters Patent is hereby corrected as shown below:

On the Title Page

Item (71) Applicant:
"Conopco, Inc., Englewood Cliffs, NJ (US)"
Should read:
--Conopco, Inc., d/b/a UNILEVER, Englewood Cliffs, NJ (US)--

Item (73) Assignee:
"Conopco, Inc., Englewood Cliffs, NJ (US)"
Should read:
--Conopco, Inc., d/b/a UNILEVER, Englewood Cliffs, NJ (US)--

Signed and Sealed this
Seventh Day of May, 2024

Katherine Kelly Vidal
*Director of the United States Patent and Trademark Office*